Jan. 15, 1952      H. J. EVANS      2,582,822
CATHODE-RAY TUBE WITH ALUMINIZED SCREEN
Filed Dec. 4, 1948
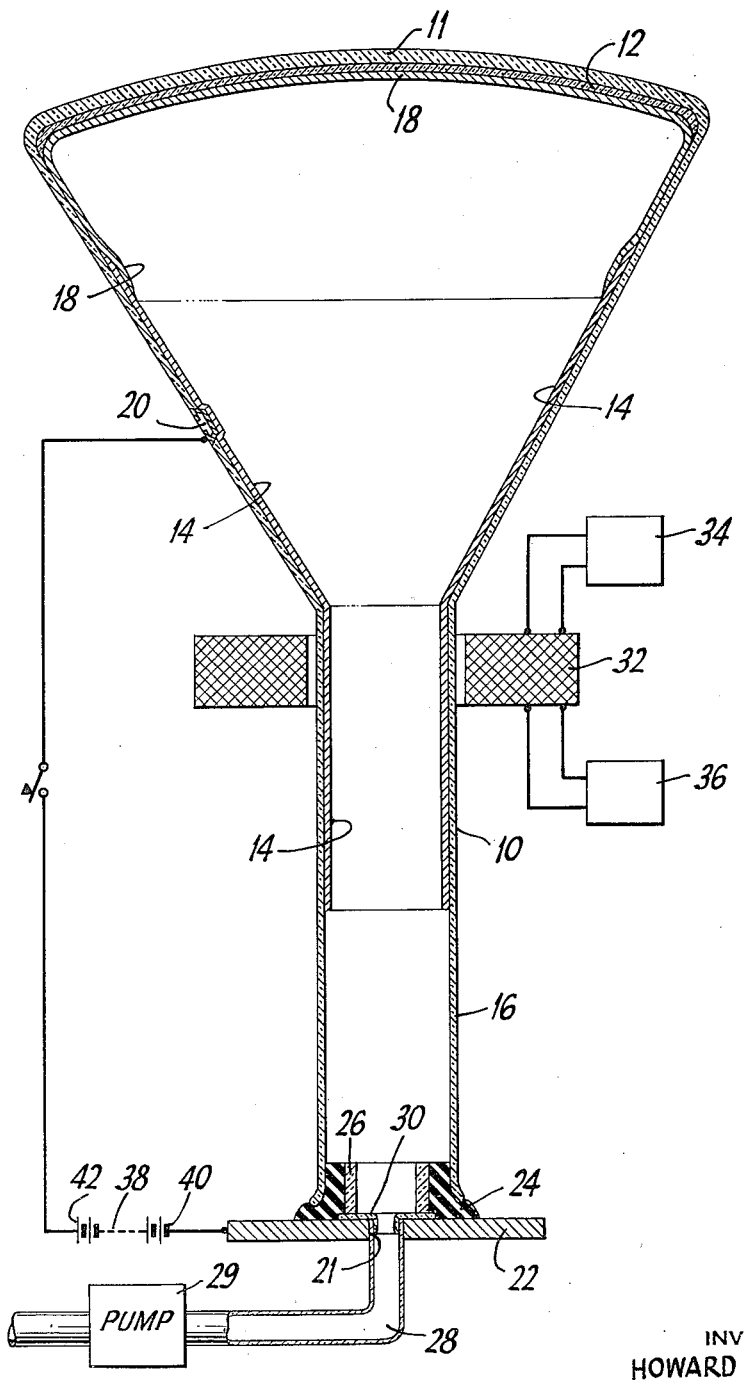
INVENTOR
HOWARD J. EVANS
BY
*William A. Balesak*
ATTORNEY

UNITED STATES PATENT OFFICE 2,582,822

CATHODE-RAY TUBE WITH ALUMINIZED SCREEN

Howard J. Evans, Lancaster, Pa., assignor to Radio Corporation of America, a corporation of Delaware Application December 4, 1948, Serial No. 63,492

6 Claims. (Cl. 313—64)

This invention relates to a method and apparatus for testing cathode ray tubes and in particular to the method for measuring the quality of aluminized phosphor screens used in television and related discharge devices.

In constructing cathode ray tubes with aluminized phosphor screens, it is necessary to complete the tube before it can be determined, by scanning the screen with the electron beam, whether the phosphor screen is of good quality. If it proves during this test, that the phosphor screen is not of a standard quality, the tube is discarded. Since such tubes are quite expensive, the discarding of a tube having a poor quality screen increases factory production costs of such tubes considerably. It is advantageous that the phosphor screen of a cathode ray tube be fully tested before completion of the tube and especially before the mounting of the expensive gun structure within the tube and the steps of exhausting and processing the tube.

Many cathode ray tubes having a fluorescent screen, particularly those of the television projection type, utilize an aluminum film backing on the fluorescent screen. Normally, the phosphor screen is deposited at one end of the cathode ray tube on the face plate and then the aluminum film is formed as a thin metal film on top of the phosphor film. The purpose of such an aluminum film is to prevent damage of the phosphor screen by ion bombardment which may be present during tube operation. Also, the aluminum film is formed sufficiently smooth to reflect light from the excited phosphor material in order to intensify the television picture. However, the presence of the aluminum film is such as to prevent a preliminary examination of the phosphor screen by ultra violet light or by high frequency alternating fields commonly used. Thus, in tubes of the type having an aluminum film, it has been necessary to complete the tube before the phosphor film can be thoroughly examined by scanning the phosphor film with the electron beam of the gun. As indicated above, the quality of the phosphor film cannot be fully determined until the tube has been entirely completed, which results in discarding of tubes whose phosphor films do not meet the standard of quality.

It is therefore an object of my invention to provide an improved method and apparatus for determining the quality of phosphor screens.

It is a further object of my invention to provide an improved method for determining the quality of aluminized phosphor screens of cathode ray tubes before completion of the tubes.

It is another object of my invention to provide an improved method and apparatus for determining the quality of aluminized phosphor screens without the use of the electron gun sealed into the tube.

The novel features which I believe to be characteristic of my invention are set forth with particularity in the appended claims, but the invention itself will best be understood by reference to the following description taken in connection with the accompanying drawing, in which the figure discloses a cathode ray tube of conventional design arranged for testing to determine the quality of the phosphor screen of the tube.

The figure shows the novel means for carrying out my novel method of measuring the quality of the aluminized phosphor screen of a cathode ray tube. In the figure is shown a conventional type cathode ray tube envelope 10. At one end of the tube on the face plate thereof, is deposited a phosphor screen 12. The phosphor screen may be of any desired type, such as zinc orthosilicate or willemite which will give a fluorescent colored light upon bombardment by a cathode ray. The phosphor film 12 may also be of any phosphor which will fluoresce when bombarded by electrons such as zinc sulfide, or of a cascade type screen in which two phosphor layers are placed one on the other to give a white fluorescence. Such a cascade screen may be, for example, a zinc cadmium sulfide layer next to the glass envelope on top of which is placed a zinc sulfide layer. After the phosphor screen 12 has been deposited on the face plate of the envelope 10, a conductive coating 14 is painted on the inside of the envelope. As shown in the figure, this conductive coating 14 extends from a point adjacent the phosphor film 12 to a point within the neck 16 of the cathode ray tube. When the tube 10 is used as a television projection tube, an intensifying aluminum film 18 is deposited over the exposed surface of the phosphor 12. This aluminum film 18 may be deposited in any manner such as that described in the co-pending applications Serial No. 12,810 filed March 3, 1948, and application Serial No. 742,117 filed April 17, 1947, by Meier Sadowsky and assigned to the same assignee as the present application. The aluminum film is usually applied by evaporating aluminum metal from a heated filament in a manner to form an aluminum layer 18 over the phosphor surface 12 and extending into contact with the conductive coating 14 as shown. A second-anode contact 20 is sealed into the glass envelope 10 to form a contact connection between the conductive anode coating 14 and the external circuit of the cathode ray tube.

At this step of the processing of the cathode ray tube 10, it is desirable to determine whether the phosphor screen 12 is of a desired quality. However, it is impossible to fully determine the quality of the screen 12 without actually scanning the phosphor 12 with a cathode ray beam. In the past, this could not be done until the electron gun of the tube was sealed into the neck 16 and the metal electrodes of the gun were degassed, the tube baked and processed, which includes the steps of exhausting the tube and flashing of an appropriate getter material within the tube to clean up any residual gasses. Upon completion of the tube, the phosphor screen 12 was scanned by the electron beam of the tube to determine the quality of the phosphor screen. The discovery of a phosphor screen of poor quality resulted in the discarding of the whole tube structure.

To provide a simple yet novel apparatus and method for testing the phosphor screen 12 of the cathode ray tube, shown in the figure, I have devised the following. The cathode ray tube 10 is first mounted on a rigid metal exhaust plate 22. Fixed within the mouth of the neck 16 of tube 10 is an apertured rubber gasket 24 of the design shown. The gasket extends within and beyond the neck and supports the tube envelope 10 upon the plate 22. A small insulating cylinder 26 passes through the aperture in the rubber gasket 24. It serves to maintain the aperture open through gasket 24, when the envelope 10 is partially exhausted. An exhaust tube 28 extends through an aperture 21 in the support plate 22. Tube 10 with the gasket 24 inserted in the neck 16 thereof is positioned upon plate 22 so that the opening through cylinder 26 is approximately coaxial with the exhaust tube 28. Prior to the positioning of the tube 10, however, a thin film 30 of, for example, a mixture of sodium silicate and graphite is painted on the metal plate 22 around the opening of the exhaust tube 28. Also, a neck yoke 32 is positioned about the neck 16 of the tube envelope 10 prior to the positioning of the tube envelope over the exhaust tube 28. The neck yoke 32 is of conventional design and comprises two pairs of coils which, when each pair of coils is respectively connected to appropriate saw-tooth generator circuits 34 and 36 as shown, there is set up in the space within the yoke 32 a pair of fields perpendicular to each other and to the axis of tube 10. These scanning fields respectively supply line and frame scansion of an electron beam directed along the axis of the tube 10. The circuits 34 and 36 of the neck yoke 32 are of a conventional design, well known in the art.

After the tube 10 has been mounted over the exhaust tube 28 as described above, the air within the tube is exhausted by connecting the exhaust tube 28 to any desired pumping means until the pressure within the envelope 10 is between 5 and 20 microns of mercury. At this point, a potential difference of approximately 7 to 10 kilovolts is established between the metal plate 22 and the aluminum film 18. This potential is established by connecting the metal support plate 22 to the negative terminal 40 of a D. C. voltage source 38 and the second-anode contact button 20 to the positive terminal 42 of the voltage source 38. Upon the establishment of the potential difference between metal plate 22 and the aluminum film 18, a glow discharge is set up through the tube between the conductive coatings 14 and 30. The positive ions formed in the discharge, strike the metal plate 22 at a potential sufficiently high to cause secondary electrons to be emitted from the silicate coating 30. This positive ion bombardment of coating 30 supplies a stable electron emission from the sodium silicate of coating 30. The secondary electron emission as well as those electrons resulting from the gas ionization within the tube are at once drawn toward the positive portions of the tube and pass roughly up the axis of the envelope 10 toward the aluminum coating 18 and through the scanning fields of the neck yoke 32. Upon applying the appropriate sawtooth potentials to the two pairs of scanning coils of the neck yoke 32, the stream of electrons passing through the neck yoke is caused to scan across the end of the tube envelope 10 roughly in the same manner as the scanning electron beam of any conventional cathode ray tube. The electrons of the stream strike the end 11 of the tube envelope with an energy sufficient to penetrate the aluminum film 18 and excite the phosphor material 12 to form a broad spot of light. As the electron stream is scanned back and forth over the target, all portions of the phosphor film 12 are brought under bombardment by the electrons of the stream. Any observer, viewing the resulting light raster, can easily determine the quality of the phosphor screen 12. If the screen 12 does not come up to the standard of quality set, the tube can at once be discarded before the gun structure of the tube has been mounted within the envelope 10 and before any extensive processing of the tube has taken place. At this stage, the glass envelope 10 can easily be salvaged in its original condition and a new phosphor film deposited upon the face plate of the envelope.

The use of the sodium silicate layer 30 provides a constant electron emission when the film 30 is bombarded by the positive gas ions of the discharge. The film 30 need not be confined to sodium silicate, but any secondary electron emitting material may be used instead, as, for example potassium silicate or any of the metal oxides which are known to provide good secondary emission. Graphite is used in the sodium silicate to provide partial conduction of the film 30, so that the potential of the film 30 can be maintained approximately that of the metal plate 22. If metal plate 22 is not coated by a secondary electron emitting film 30, the metal of the plate itself will not provide a satisfactory source of electrons. The metal parts of plate 22 exposed to the positive ions of the discharge tend to give off electrons in bursts which will support arcing through the tube. This would be true of any metal part exposed to the positive ion bombardment of the discharge. Thus, it is desirable that the exhaust tubulation 28 be of glass or of an insulating material. Also, for this same reason, it is desirable that the ring 26 be of a silica or insulating material instead of metal.

The secondary electrons from the silicate film 30 as well as those electrons provided by the ionization of the gas in the tube are collimated by the tube neck 16. Although outer portions of the electron stream will be drawn over to the positive conductive coating 14, the center portion of the electron stream will pass down the axis of the tube and will strike the fluorescent screen 12 to provide a luminescent spot slightly smaller than the cross-sectional area than the tube neck 16.

To provide a successful operation of this method, the gas pressure within the tube is somewhat critical. Thus, if the pressure within the tube is less than 5 microns, there will be insufficient gas to support a large enough discharge to produce a visible effect on the fluorescent screen 12. Also, at the other limit, too great a gas pressure within the tube would provide arcing resulting in a visible gaseous discharge, which would not be effective for careful examination of the fluorescent screen. As described above, the satisfactory gas pressure is that between 5 and 20 microns, although it is possible to sustain a glow discharge in air up to 500 microns, which would produce a satisfactory electron discharge from coating 30.

By the above-described apparatus and method, it is possible to examine the phosphor screen 12 of a cathode ray tube for any defect in the screen formed during the processing of the tube. Thus, an observer is able to detect thin spots or areas on the screen or pin point breaks in the aluminum film which can be seen only when the phosphor is excited. Also, green and purple spots which commonly occur due to contamination of the phosphor screen can be easily detected as well as breaks in the phosphor itself.

The above-described process is not necessarily limited to aluminized screens although the process was mainly developed to examine aluminized phosphor screens. It is possible to use this method on a non-aluminized screen in which the aluminum film 18 of the drawing can be eliminated. A glow discharge may be then set up between the conductive coating 14 on the tube surface of the metal plate 22. The high positive potential of the graphite coating 14 is sufficient to accelerate the central portion of the secondary emission from the silicate layer 30 so that it will strike the fluorescent screen 12 and cause visible excitation. The phosphor screen can then be examined by scanning this spot across the screen 12.

The above-described apparatus and method for measuring the quality of a phosphor screen need not be confined to television projection tube designs. The same process may be utilized in testing the phosphor screen of any type of discharge tube. It also may be feasible to use such a method to test other surfaces and films, the nature of which can be determined by electron bombardment. The above method is relatively simple and can be performed in a factory by relatively unskilled operators. Furthermore, the equipment required for such testing is relatively simple and inexpensive.

While certain specific embodiments have been illustrated and described, it will be understood that various changes and modifications may be made therein without departing from the spirit and scope of the invention.

What I claim as new is:

1. The method of determining the quality of a phosphor screen within a discharge tube, said screen having a conductive film in contact therewith, said method comprising the steps of, inserting a removable secondary electron emitting electrode within said tube, partially evacuating the air from said discharge tube, establishing a positive potential on said conductive film, establishing a negative potential on said secondary electron emitting electrode exposed to the residual air within said tube to provide a gaseous discharge within said tube directed toward said phosphor screen, scanning a negative portion of said discharge over said phosphor screen to excite said screen to phosphorescence.

2. Apparatus for testing a phosphor screen within a partially closed envelope having an electrode therein, said apparatus comprising means for closing said envelope, said means including an electrode for providing a source of electrons and exhaust means for partially evacuating said envelope, and a source of high potential connected to said electron source and adapted to be connected to said electrode in said envelope.

3. Apparatus for determining the quality of a phosphor screen within the envelope of a discharge device including an electrode within said envelope and an opening through said envelope, said apparatus comprising, means for closing the opening through the envelope, said closing means including an electrode having a semi-conducting coating as a source of electrons and exhaust means for partially evacuating said envelope, a source of high potential conductively connected to said coated electrode and adapted to be connected to said electrode within said envelope, whereby the residual gas within said envelope is ionized to furnish an electron emission from said coated electrode, and means for scanning the electron emission over said phosphor screen.

4. Apparatus for determining the quality of a phosphor screen within the envelope of a discharge device including an electrode within said envelope and an opening through said envelope, said apparatus comprising means for closing the opening through the envelope, said closing means including an electrode having a semi-conducting coating as a source of electrons and exhaust means for partially evacuating said envelope, a source of high potential conductively connected to said coated electrode and adapted to be connected to said electrode within said envelope, whereby the residual gas within said envelope is ionized to furnish an electron emission from said coated electrode, and a neck yoke adapted to surround a portion of the tube envelope between said electrons, said neck yoke including means for subjecting the electron emission from said coated electrode to deflecting fields for scanning said electron emission over said phosphor screen.

5. The method of examining a phosphor screen within a cathode ray tube having one end open and an electrode therein, said method comprising the steps of, inserting a removable source of charged particles in said open tube end, partially evacuating the air from said discharge tube, establishing a difference of potential between said electrode and said removable source of charged particles to provide a gaseous discharge within said tube, scanning a portion of said discharge over said phosphor screen to excite said screen to phosphorescence.

6. The method of examining a phosphor screen within a cathode ray tube having one end open and an electrode therein, said method comprising the steps of, closing said open tube end with a removable closure member including an electron source, partially evacuating the air from said discharge tube, establishing a difference of potential between said electrode and said removable source of charged particles to provide a gaseous discharge within said tube, scanning a portion of said discharge over said phosphor screen to excite said screen to phosphorescence.

HOWARD J. EVANS.

REFERENCES CITED

The following references are of record in the file of this patent:

UNITED STATES PATENTS

| Number | Name | Date |
|---|---|---|
| 2,100,697 | Loewe | Nov. 30, 1937 |
| 2,161,458 | De Boer et al. | June 6, 1939 |
| 2,303,563 | Law | Dec. 1, 1942 |
| 2,439,181 | Nicoll | Apr. 6, 1948 |
| 2,467,953 | Bancroft et al. | Apr. 19, 1949 |